United States Patent
Brisebois et al.

(10) Patent No.: US 7,152,127 B1
(45) Date of Patent: Dec. 19, 2006

(54) MULTI-PURPOSE PERIPHERAL INTERFACE FOR COMPUTING SYSTEMS

(75) Inventors: Lawrence Ralph Brisebois, San Diego, CA (US); Michael Levon Broussalian, Moorpark, CA (US); Eric Gary Malo, San Diego, CA (US)

(73) Assignee: Flextronics Sales and Marketing (A-P) Ltd. (MU)

( * ) Notice: Subject to any disclaimer, the term of this patent is extended or adjusted under 35 U.S.C. 154(b) by 769 days.

(21) Appl. No.: 10/266,312

(22) Filed: Oct. 7, 2002

(51) Int. Cl.
*G06F 13/00* (2006.01)

(52) U.S. Cl. .................. 710/303; 710/304; 710/301; 710/302; 710/316

(58) Field of Classification Search ........ 710/301–304, 710/313, 316–317
See application file for complete search history.

(56) References Cited

U.S. PATENT DOCUMENTS

| | | | |
|---|---|---|---|
| 5,920,731 A * | 7/1999 | Pletl et al. ............ | 710/14 |
| 6,438,638 B1 * | 8/2002 | Jones et al. .......... | 710/301 |
| 6,658,516 B1 * | 12/2003 | Yao ..................... | 710/301 |
| 6,807,597 B1 * | 10/2004 | Oh et al. .............. | 710/301 |
| 2003/0065867 A1 * | 4/2003 | Mowery et al. ...... | 710/310 |
| 2004/0059860 A1 * | 3/2004 | Liu et al. ............. | 710/313 |

* cited by examiner

*Primary Examiner*—Rehana Perveen
*Assistant Examiner*—Kim T. Huynh (57) ABSTRACT

A system for interfacing a multi-interface card to a non-standard interface is provided. The system includes a detection module that detects an input signal; and a switching module that operationally couples the multi-interface card to an interface based on the input signal. The switching module operationally couples the multi-interface card to a serial interface, a USB interface, a PCMCIA interface or to any non-PCMCIA interface. The system also provides a docking device that is coupled to a computing device, for interfacing a multi-interface card to non-standard interfaces. The docking device includes an interface that receives the multi-interface card; detection logic for detecting the multi-interface card; and a converter that receives signal from the multi-interface card and converts the signals based on an interface that couples the docking device to the computing system.

6 Claims, 8 Drawing Sheets

| Card Detect #1 | Card Detect #2 | A | Enable | Shutdown |
|---|---|---|---|---|
| 1 | 1 | 0 | 1 | 1 |
| 1 | 0 | 0 | 1 | 1 |
| 0 | 1 | 0 | 1 | 1 |
| 0 | 0 | 1 | 1 | 0 |
| 1 | 1 | 0 | 0 | 1 |
| 1 | 0 | 0 | 0 | 1 |
| 0 | 1 | 0 | 0 | 1 |
| 0 | 0 | 1 | 0 | 1 |

*FIG. 4B*

MULTI-PURPOSE PERIPHERAL INTERFACE FOR COMPUTING SYSTEMS

BACKGROUND OF THE INVENTION

1. Field of the Invention

The present invention relates to computing systems, and more particularly, to peripheral interfaces.

2. Background

Various peripheral devices today interface with different computing devices (e.g. desktop computers, handheld portable devices, including, portable digital assistants ("PDAs") and cell phones; and laptops etc.). These devices often require different interfaces to operate with the computing devices. Mostly, such interfaces are defined by a standard organization, e.g., USB, I.E.E.E. 1394 and Personal Computer Memory Card International Association, ("PCMCIA").

PCMCIA is a standard organization consisting of more than five hundred companies which developed a standard for small, credit card-sized devices, called PC Cards (PCMCIA cards). The PCMCIA standard is incorporated herein by reference in its entirety. Originally designed for adding memory to portable computers, the PCMCIA standard has been expanded several times and is now suitable for many types of devices. There are three types of PCMCIA cards, having the same rectangular size (85.6 by 54 millimeters), but different widths:

Type I card can be up to 3.3 mm thick, and are used primarily for adding additional ROM or RAM to a computer;

Type II card can be up to 5.5 mm thick and are often used as modem and fax modem cards; and Type III cards can be up to 10.5 mm thick often used for portable disk drives.

As with the PCMCIA cards, PCMCIA slots also come in three sizes:

A Type I slot can hold one Type I card;

A Type II slot can hold one Type II card or one Type I card; and

Figure 1A:
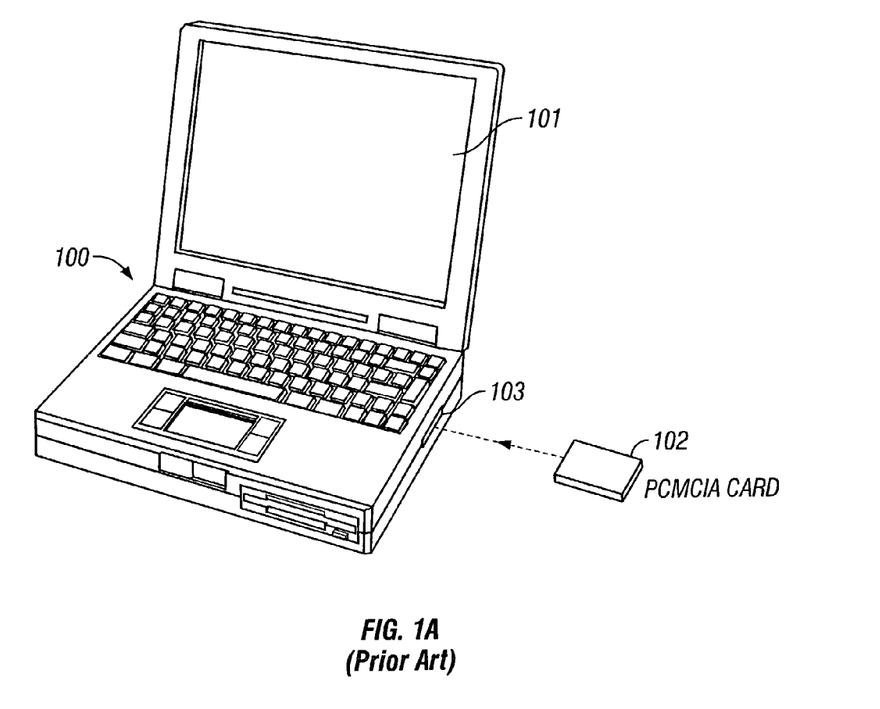
FIG. 1A, as described above shows a block diagram of a laptop computer using a PCMCIA card.

A Type III slot can hold one Type III card or sometimes a combination of two, Type I and/or Type II cards. Currently, a PCMCIA card is used with a laptop computer via a standard PCMCIA slot provided by laptop manufacturers. An example of this is provided in FIG. 1A, which shows a laptop computer 100 with a display screen 101. Laptop computer 100 includes a slot 103 that receives a PCMCIA card 102. When PCMCIA card 102 is placed in slot 103, laptop computer 100 can access PCMCIA card 102 and its functionality.

PCMCIA card 102 cannot be used to communicate with a desktop computer unless a custom PCMCIA slot is provided in the desktop computer. Most desktop computers today do not have a standard PCMCIA slot. Similarly, the same PCMCIA card cannot be used with many handheld devices like a personal digital assistant ("PDA").

This problem is not just limited to PCMCIA cards but other cards as well, e.g., compact flash ("CF") cards.

Therefore, there is a need for a system that can operationally couple a multi-interface card to a computing system.

SUMMARY OF THE INVENTION

In one aspect of the present invention the foregoing drawbacks are solved by a system for interfacing a multi-interface card to a non-standard interface. The system includes a detection module that detects an input signal; and a switching module that operationally couples the multi-interface card to an interface based on the input signal. The switching module operationally couples the multi-interface card to a serial interface, a USB interface, a PCMCIA interface or to any non-PCMCIA interface.

In another aspect of the present invention, a docking device is provided that is coupled to a computing device, for interfacing the multi-interface card to non-standard interfaces. The docking device includes an interface that receives the multi-interface card; detection logic for detecting the multi-interface card; and a converter that receives signal from the multi-interface card and converts the signals based on an interface that couples the docking device to the computing system. The converter may be a RS-232 converter which converts signals from the multi-interface card such that the signal can be read by a serial port.

In one aspect of the present invention, the multi-interface card may be a modified PCMCIA or a modified compact flash card.

In one aspect of the present invention, the docking device operationally couples plural standard interfaces to a computing device without individual slots required by the standard card(s) for supporting the interface(s).

This brief summary has been provided so that the nature of the invention may be understood quickly. A more complete understanding of the invention can be obtained by reference to the following detailed description of the preferred embodiments thereof, in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following figures.

DETAILED DESCRIPTION OF THE PREFERRED EMBODIMENTS

Definitions: The following definitions are used in various aspects of the present invention and with respect to the peripheral devices (but not exclusively):

"PCMCIA" means Personal Computer Memory Card International Association.

"USB" means Universal Serial Bus.

To facilitate an understanding of the preferred embodiment, the general architecture and operation of a computing system will be described first. The specific process under the preferred embodiment will then be described with reference to the general architecture.

Figure 1B:
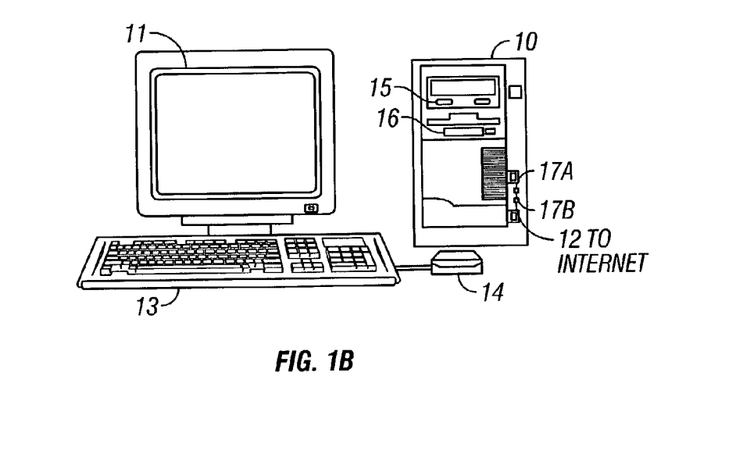
FIG. 1B shows a block diagram of a computing system that can use a PCMCIA card, according to one aspect of the present invention.

FIG. 1B is a block diagram of a computing system for executing computer executable process steps according to one embodiment of the present invention. FIG. 1B includes a host computer 10 and a monitor 11. Monitor 11 may be a CRT type, a LCD type, or any other type of color or monochrome display. Also provided with computer 10 is a keyboard 13 for entering text data and user commands, and a pointing device 14 for processing objects displayed on monitor 11.

Computer 10 includes a computer-readable memory medium such as a rotating disk 15 for storing readable data. Besides other programs, disk 15 can store application programs.

Computer 10 can also access computer-readable floppy disks storing data files, application program files, and computer executable process steps embodying the present invention or the like via a floppy disk drive 16. A CD-ROM, or CD R/W (read/write) interface (not shown) may also be provided with computer 10 to access application program files, stored objects, audio files and data files stored on a CD-ROM. A modem, an integrated services digital network (ISDN) connection, or the like also provides computer 10 with an Internet connection 12 to the World Wide Web (WWW). The Internet connection 12 allows computer 10 to download data files, audio files, movies, video, remote objects, application program files and computer-executable process steps embodying the present invention.

Computing system 10 includes serial port 17A and USB port 17B that allows computing system 10 to communicate with serial port devices and USB devices.

It is noteworthy that the present invention is not limited to the FIG. 1B architecture. For example, notebook or laptop computers, handheld devices, set-top boxes or any other system capable of running computer-executable process steps, as described below, may be used to implement the computer-executable process steps according to one aspect of the present invention.

Figure 1C:
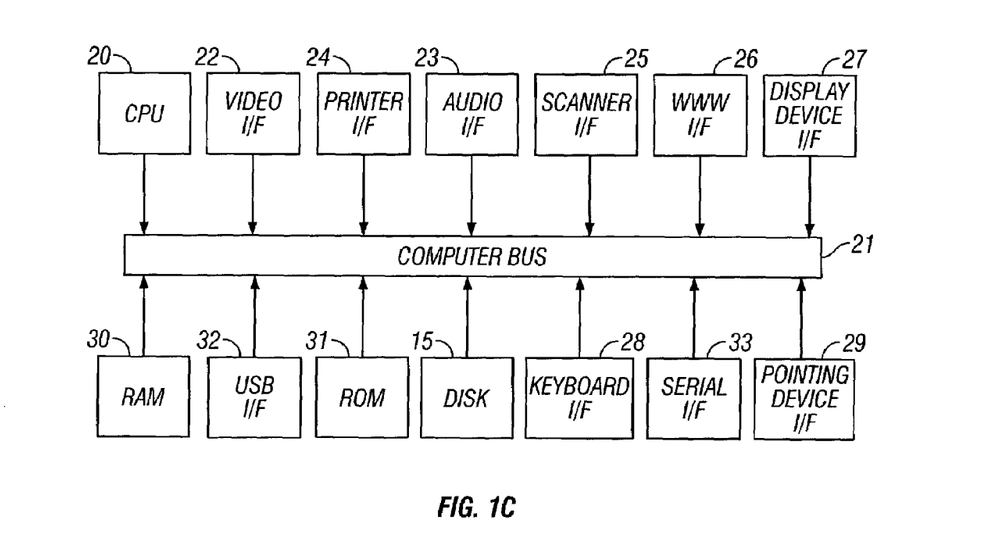
FIG. 1C shows the internal architecture of the computing device shown in FIG. 1B.

FIG. 1C is a block diagram showing the internal functional architecture of computer 10. As shown in FIG. 1C, computer 10 includes a central processing unit (CPU) 20 for executing computer-executable process steps and interfaces with a computer bus 21. Also shown in FIG. 1C are a video interface 22, an audio interface 23, a printer interface 24, a scanner interface 25, a WWW interface 26, a display device interface 27, a keyboard interface 28, a pointing device interface 29, a rotating disk 15, a USB interface 32 and a serial port interface 33.

USB interface 32 allows CPU 20 to access USB devices via USB port 17B, while serial port interface 33 allows CPU to access devices that can be operationally coupled to computing system 10 via serial port 17A.

As described above, disk 15 stores operating system program files, and application program files. Some of these files are stored on disk 15 using an installation program. For example, CPU 20 executes computer-executable process steps of an installation program so that CPU 20 can properly execute the application program.

A random access main memory ("RAM") 30 also interfaces to computer bus 21 to provide CPU 20 with access to memory storage. When executing stored computer-executable process steps from disk 15 (or other storage media such as floppy disk 16 or WWW connection 12), CPU 20 stores and executes the process steps out of RAM 30.

Read only memory ("ROM") 31 is provided to store invariant instruction sequences such as start-up instruction sequences or basic input/output operating system (BIOS) sequences for operation of keyboard 13.

Figure 1D:
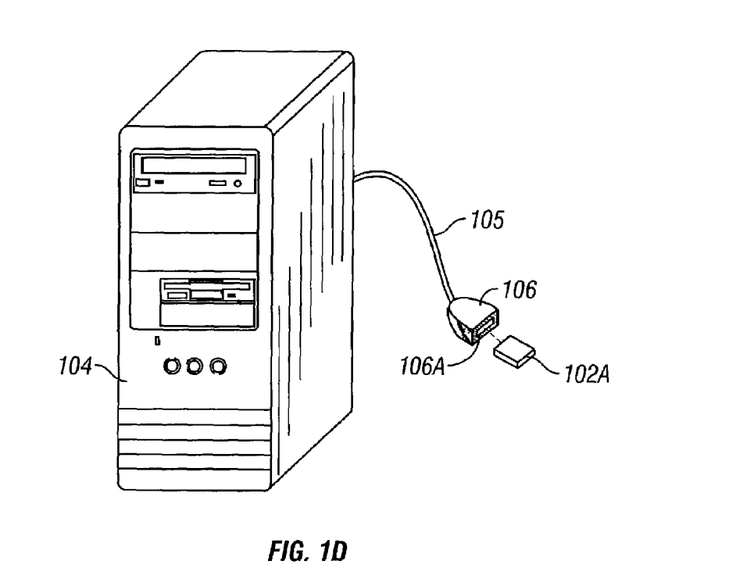
FIG. 1D is a block diagram of a system according to the present invention that uses a docking device for operationally coupling a PCMCIA card to plural interfaces.

FIG. 1D shows a desktop computer 104 (similar to computing system 10), which is coupled to a docking device 106 via cable 105 and serial port 17A (or USB port 17B). In one aspect of the present invention cable 105 may be a serial cable (or a USB cable if docking device 106 couples to USB port 17B). It is noteworthy that the present invention is not limited to any particular interface, cable design Modified PCMCIA card 102A (also referred to herein as a multi-interface card), according to one aspect of the present invention, is placed in docking device slot 106A. This allows desktop computer 104 to access PCMCIA card 102A via an existing interface, e.g., serial or USB interface. It is noteworthy that the invention is not limited to just a modified PCMCIA card 102A, other multi-interface cards may be used to implement the various adaptive aspects of the present invention.

Figure 2A:
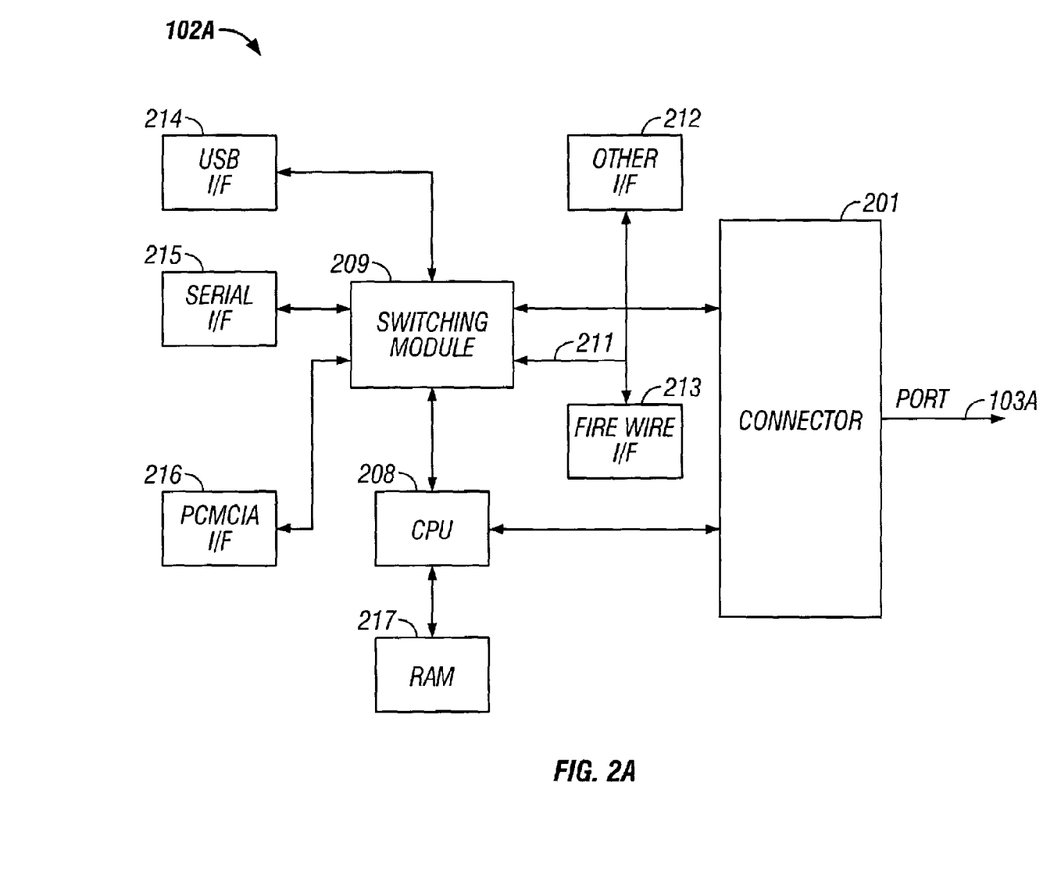
FIG. 2A shows a block diagram of a modified PCMCIA card, according to one aspect of the present invention.

FIG. 2A is a block diagram of modified PCMCIA card 102A which includes a standard 68-pin connector (per the PCMCIA standard) 201 that operationally couples to slot 106A. PCMCIA card 102A includes a processor 208 that is coupled by a local bus (not shown) to a switching module 209. Switching module 209 is coupled to a fire wire interface 213, USB interface 214, serial interface 215, PCMCIA interface 216 and/or other interfaces 212.

Processor 208 detects input 202 via connector 201 and if it is a standard PCMCIA signal (e.g. the signal generated if the card were to be inserted in slot 103 of laptop computer 100) then switching module 209 operationally couples card 102A via PCMCIA interface 216 to the computing device (in this example, laptop 103).

If signal 202 is a not a standard PCMCIA signal, (for example, if a signal for a serial port is generated when PCMCIA card 102A is inserted in slot 106A and docking device 106 were coupled to serial port 17A) then switching module 209 couples PCMCIA card 102A with the appropriate interface (in this example, serial port interface 215 that couples PCMCIA card 102A to serial port 17A via docking device 106).

Figure 2B:
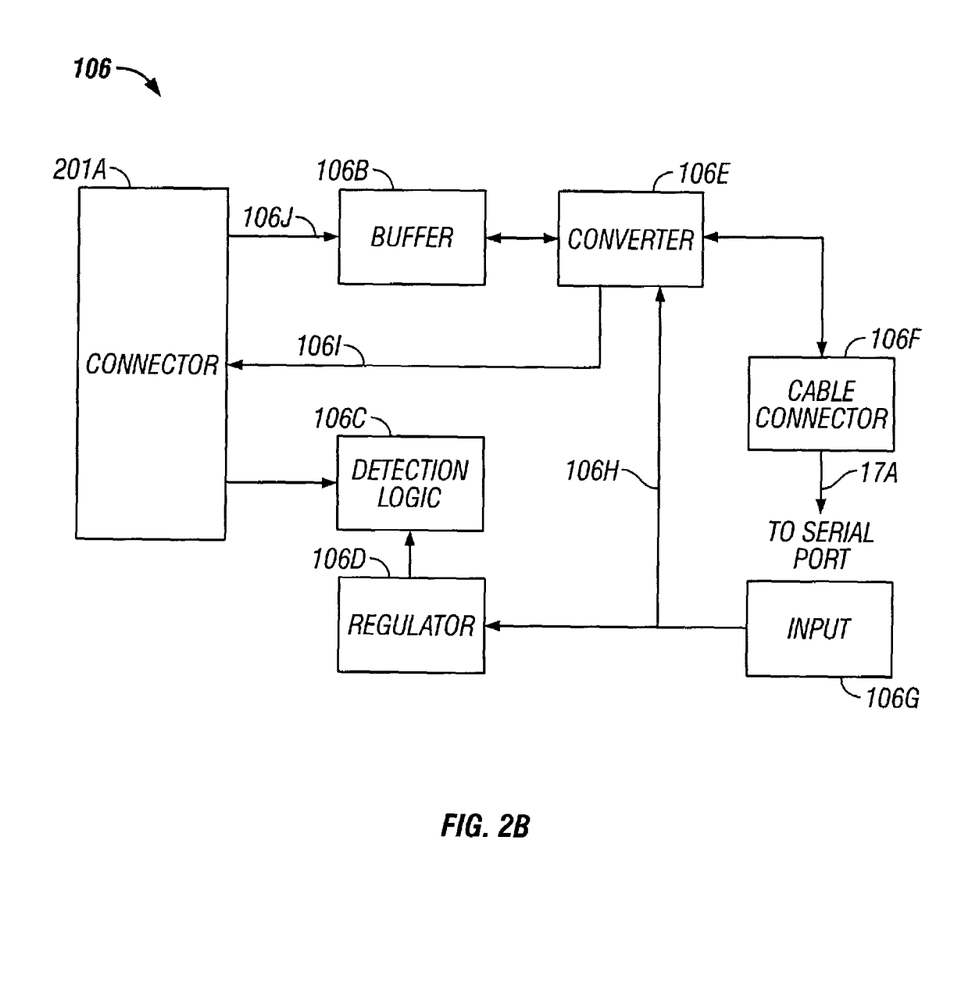
FIG. 2B shows a block diagram of a docking device according to one aspect of the present invention.

FIG. 2B is a block diagram showing various components of docking device 106. Docking device 106 includes a modified 68pin PCMCIA interface 201A that receives connector 201 of modified PCMCIA card 102A. Docking device 106 includes a card detection module 106C that detects card 102A and ascertains if this card is a standard PCMCIA card or can be used with other interface (e.g., serial interface, in this example). In one aspect of the present invention, modified PCMCIA card 102A is not powered unless it is for a specific interface, e.g., a serial interface.

Docking device 106 includes a cable connector 106F that couples docking device to serial port 17A or any other port that is supported by docking device 106.

Docking device 106 also includes converter 106E. In one aspect of the present invention, converter 106E receives signal 106J from card 102A and transmits the same via serial port 17A. Converter 106E also receives data from computing system 10 and then transmits the data via connection 106I.

A regulator 106D provides power to detection logic 106C and converter 106E. Regulator 106H powers interface 201A when enabled by detection logic 106C. Regulators 106H and 106D are powered via DC pin connector 106G.

Figure 2C:
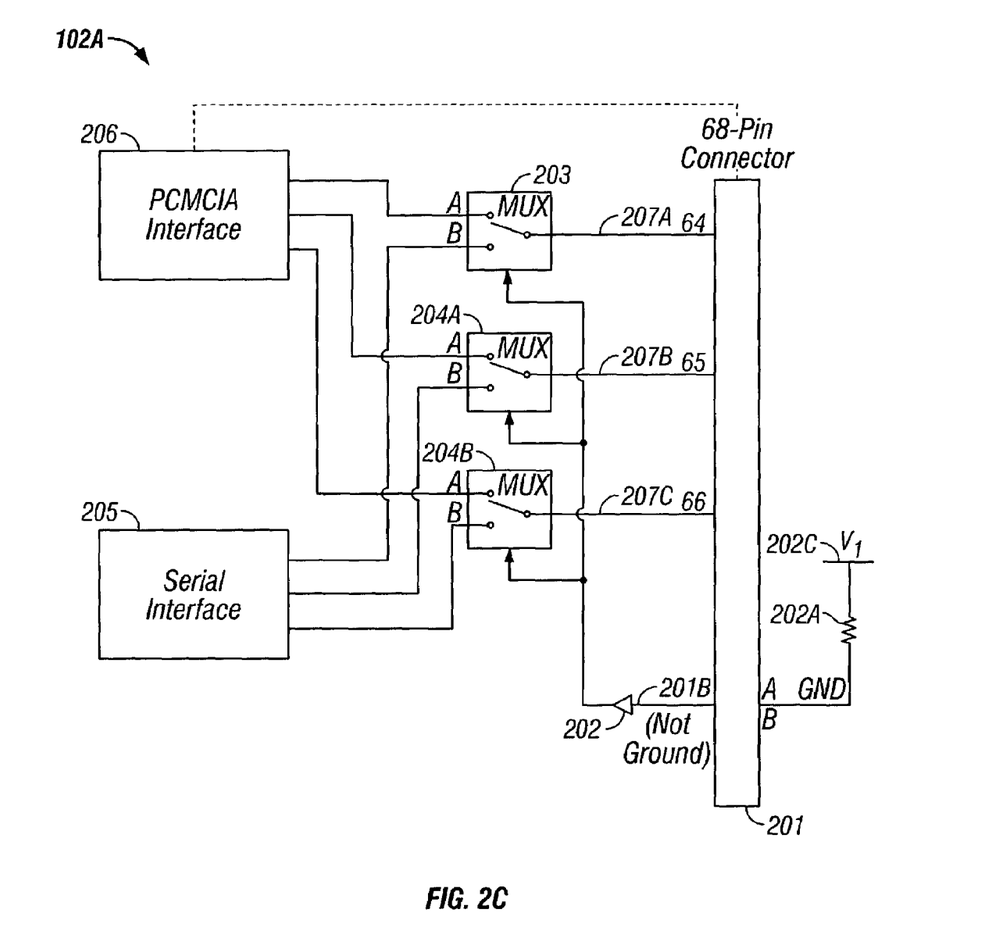
FIG. 2C shows a schematic of the modified PCMCIA card, according to one aspect of the present invention.

FIG. 2C is a schematic diagram of modified PCMCIA card 102A. Modified PCMCIA Card 102A includes connector 201. In a typical PCMCIA card 102, pin 1 201B is grounded. However in modified PCMCIA card 102A, according to the present invention, pin 1 201B is used to generate signal 202 when card 102A is placed in slot 106A for a connection with a non-standard PCMCIA slot.

In this example, if card 102A is placed in slot 103, then pin 1 201B is grounded and functions as a standard PCMCIA card. However, if card 102A is placed in slot 106A in docking device 106 that is coupled to a non-standard PCMCIA slot, e.g., serial port 17A, then signal 202 is generated. This signal is generated by detection block 106C, as discussed below in detail.

If signal 202 is a standard PCMCIA signal, then switch modules 203, 204A and 204B turn on mode A to operationally couple PCMCIA interface 206 to a computing device.

If signal 202 is non-PCMCIA signal (e.g. serial port), then switching module 203, 204A and 204B are switched to mode B such that card 102A is coupled to a computing device via serial interface 205 and serial port 17A. It is noteworthy that the invention is not limited to serial ports, any other interface may be used.

Figure 3A:
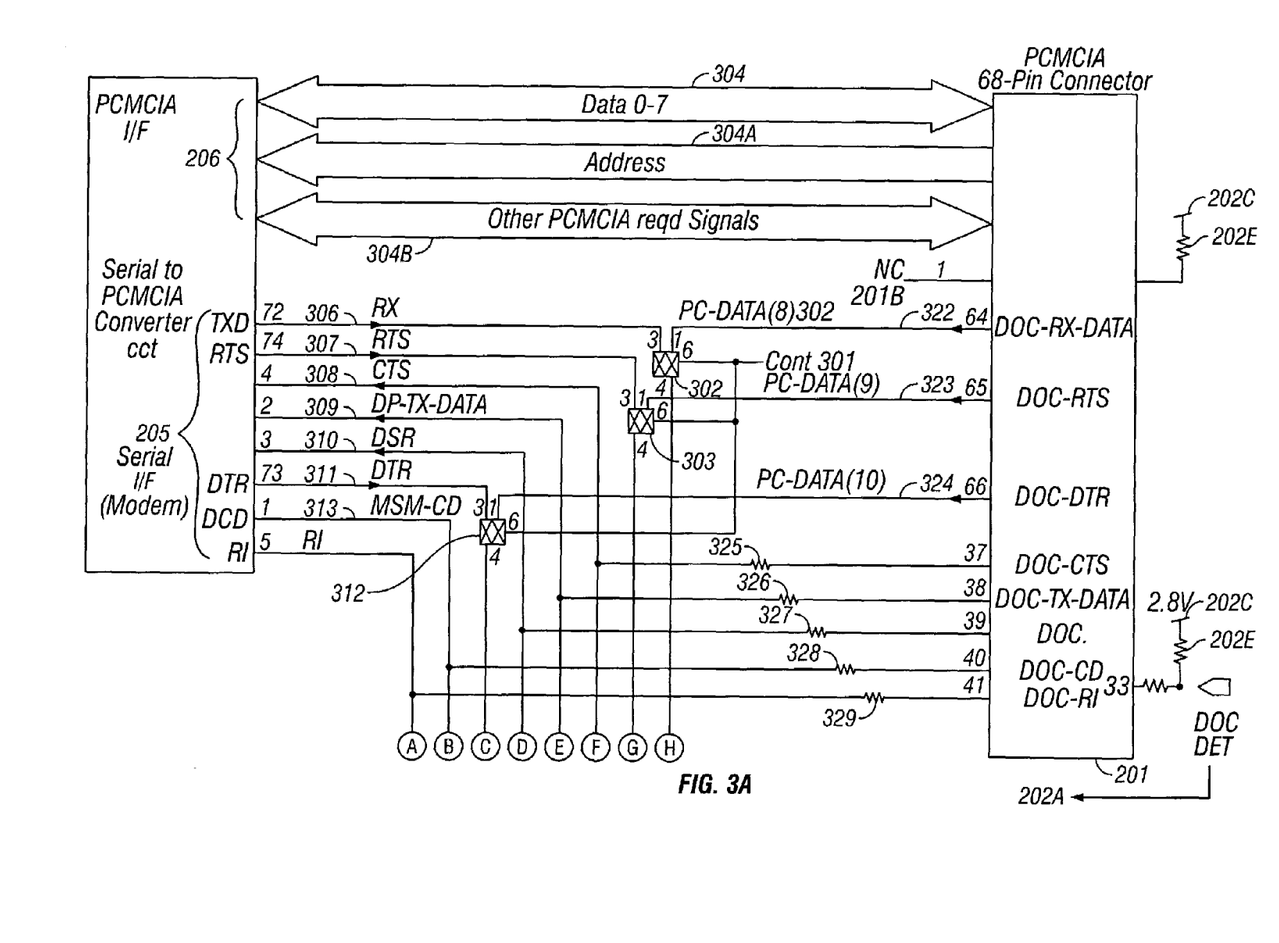
FIGS. 3A and 3B show a detailed schematic of a modified PCMCIA card, according to one aspect of the present invention.
Figure 3B:
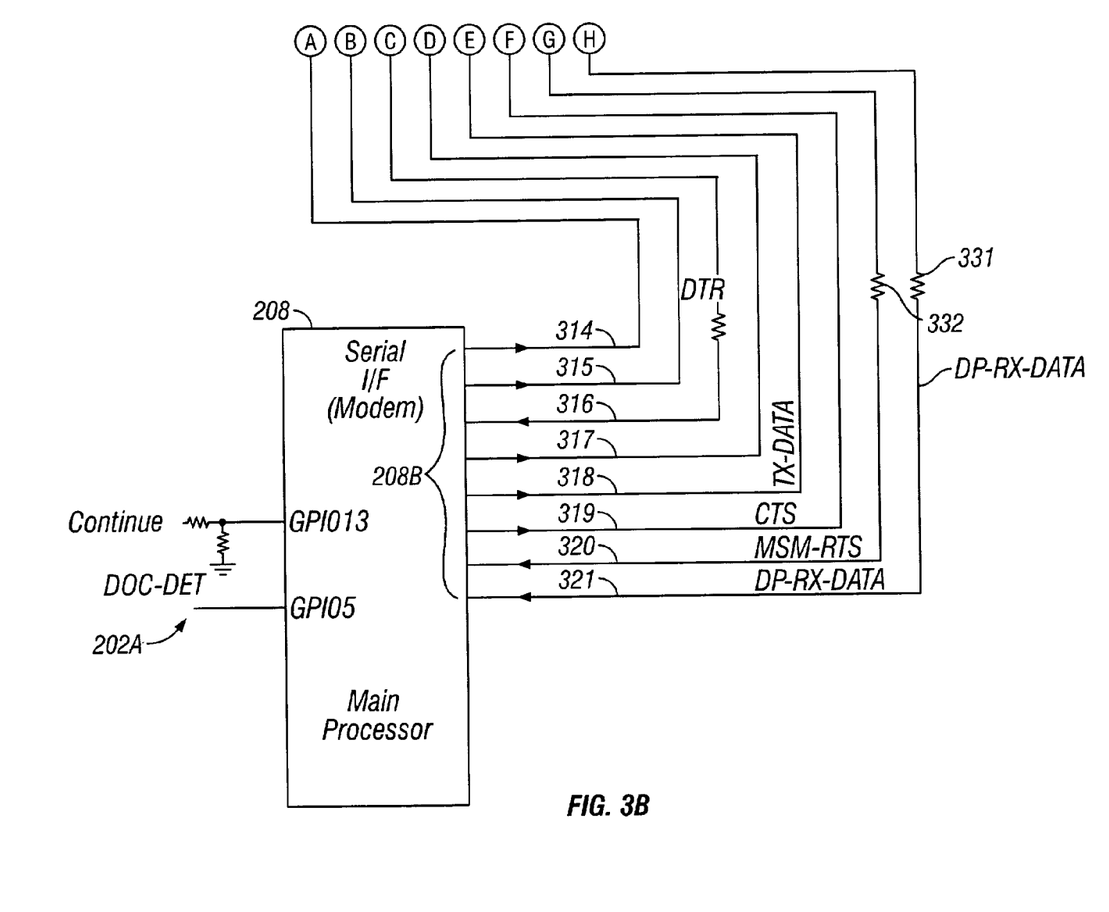

FIG. 3 is a detailed schematic of modified PCMCIA card 102A. FIG. 3 shows pin 201B that detects an input signal 202A. Based on input signal 202A, a control signal 301 is generated by CPU 208. Depending upon control signal 301; switches 302, 303 and 312 are flipped. For example, if signal 202A is for a PCMCIA interface, then PCMCIA interface 206 is operationally coupled via connector 201. If signal 202 is for a serial port, as discussed above, then serial interface 205 is operationally coupled via connector 201 and serial 17A.

Resistors 325–329 are coupled in parallel and are used when CPU 208 outputs data (or signals) to the computing device(s).

The following provides a brief explanation of the various signals that are used in various adaptive aspects of the present invention:

Signal 306: Receive data signals from PCMCIA converter 206A.

Signal 307: Request to send signal from interface 205 in PCMCIA mode or from serial interface in non-PCMCIA mode to switch module 303. Signal 307 is generated by PCMCIA I/F 206 or serial interface 208B.

Signal 308: Output signal from CPU 208 to serial interface 205 or to docking device 106.

Signal 309: Transmit data signal to PCMCIA converter 206A.

Signal 311: Data Terminal Ready signal is generated by serial interface 208B and sent to switch module 312 to transmit data to CPU 208.

Signal 313: MSM-CD (Carrier Detect) signal is received by PCMCIA converter 206A from processor 208 for status indication sent to host PC 10.

Signal 314: Ring Indicator signal 314 is sent to PCMCIA converter 206A from processor 208 for status indication to host PC 10.

Signal 315: Data transmit signal from CPU 208 via resistor 329 to serial interface 208B and PCMCIA converter 206A.

Signal 316: Data Terminal Ready signal is sent to CPU 208 via resistor 328 from serial interface 208B.

Signal 317: "Data Set Ready" signal sent from CPU 208 to transmit data via resistor 327 to serial interface 208B.

Signal 318: Transmit Data signal via resistor 326 to transmit data from CPU 208 to serial interface 208B.

Signal 319: Output "Clear to Send" signal from CPU 208 to PCMCIA converter 206A or to docking device 106 to indicate status to host PC 10.

Signal 320: MSM_RTS ("Request to Send" signal) from switch module 303 to CPU 208 for data flow-control purposes.

Signal 321: Rx (Receive Data) signal from switch 302 to CPU 208.

Signal 322: Received data signal from docking port 106 to switch module 302.

Signal 323: Received control signal from docking port 106 to switch module 303.

Signal 324: Data terminal signal from docking port 106 to CPU 208 that indicates the host status to CPU 208.

NC 201B is normally ground in conventional cards. In one aspect of the present invention signal 202 based on a voltage supply 202C, resistor 202E and switch 202D signals docking device 106 if a multi-interface card is inserted in slot 106A.

Figure 4A:
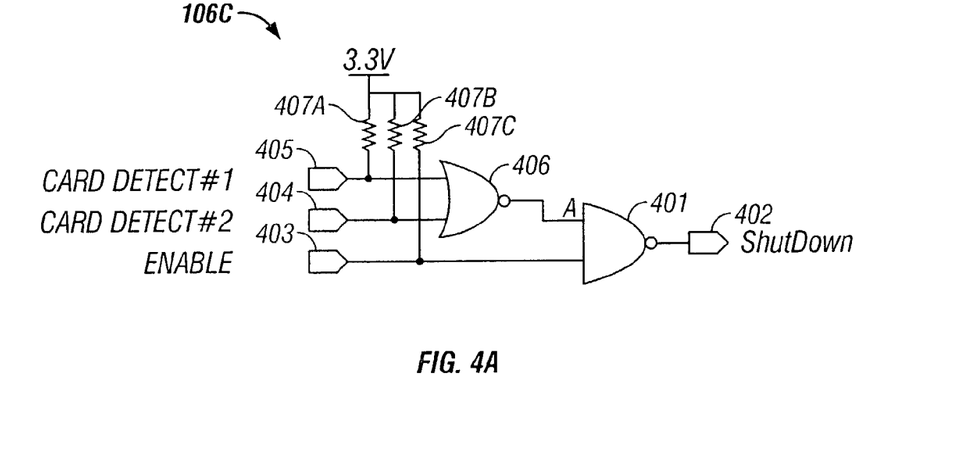
FIG. 4A is schematic of detection logic, according to one aspect of the present invention.
Figure 4B:
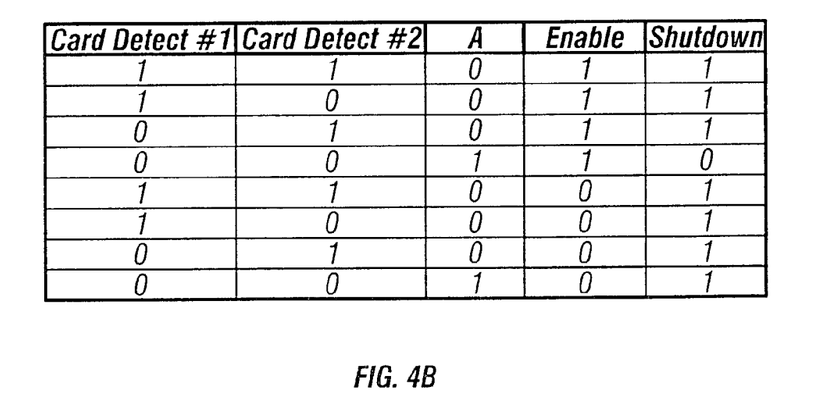
FIG. 4B is a table showing a logic table, according to one aspect of the present invention.

FIG. 4A shows the internal circuitry detection module 106C and FIG. 4B shows a logic table for the detection. In one aspect of the present invention the FIG. 4A circuitry allows docking device 106 to determine if a multi-interface card has been inserted in slot 106A. Signal 404 and 405 are standard PCMCIA signals generated for a standard PCMCIA card. Signal 403 is generated if a multi-interface card (e.g. modified card 102A) is inserted in slot 106A. Signal 403 is sent to NAND cell 401 that generates signal 402. If a multi-interface card is not present in slot 106A, then a shut down signal 402A is generated and the inserted card is not powered up.

it is noteworthy that although the foregoing description discusses a modified PCMCIA card the present invention is not limited to PCMCIA cards. A multi-interface card is operationally coupled via docking device 106 to a computing system 10.

In one aspect of the present invention, the docking device operationally couples plural standard interface cards to a computing device without individual slots required by the standard card(s).

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A system for a computing system, comprising:
a docking device that interfaces with the computing system via a cable; and a multi-interface card with a switching module and a processor; wherein the docking device receives the multi-interface card and detects if the multi-interface card is a standard or a non-standard PCMCIA card, and the switching module is coupled to at least a fire wire interface, USB interface, serial interface and a PCMCIA interface; and when the processor detects a standard PCMCIA signal the multi-interface card operates as a standard PCMCIA card and if an input signal is a non-standard PCMCIA signal, then switching module couples the multi-interface card to an interface based on the non-standard PCMCIA signal; wherein the non-standard PCMCIA signal is generated via a pin which is grounded for a standard PCMCIA card; and if a non-multi-interface card is inserted in the docking device, the docking device generates a signal so that the non-multi-interface card is not powered up.

2. The system of claim 1, wherein the multi-interface card is operationally coupled to any other interface.

3. The system of claim 1, wherein the multi-interface card may be a modified compact flash card.

4. A docking device for a computing system, comprising:

a modified interface that receives a multi-interface card with a switching module and a processor; wherein the modified interface receives and detects if the multi-interface card is a standard or a non-standard PCMCIA card; wherein the switching module is coupled to at least a fire wire interface, USB interface, serial interface and a PCMCIA interface;

a detection logic for detecting a signal, if a standard PCMCIA signal is detected, the multi-interface card operates as a standard PCMCIA card and if an input signal is detected, the multi-interface card operates as a non-standard PCMCIA signal and the switching module couples the multi-interface card to an interface based on the non-standard PCMCIA signal; wherein the non-standard PCMCIA signal is generated via a pin which is grounded for a standard PCMCIA card; and if a non-multi-interface card is inserted in the docking device, the docking device generates a signal so that the non-multi-interface card is not powered up; and a converter that receives the signal from the multi-interface card and converts the signal based on the interface that couples the docking device to the computing system.

5. The docking device of claim 4, wherein the converter is a RS-232 converter which converts signals from the multi-interface card such that the signal can be read by a serial port.

6. The docking device of claim 4, wherein the multi-interface card may be a modified compact flash card.

* * * * *